(12) United States Patent
Nedovic et al.

(10) Patent No.: US 7,027,345 B2
(45) Date of Patent: Apr. 11, 2006

(54) CONDITIONAL PRE-CHARGE METHOD AND SYSTEM

(75) Inventors: Nikola Nedovic, San Jose, CA (US); Vojin G. Oklobdžija, Berkely, CA (US); William W. Walker, Los Gatos, CA (US)

(73) Assignee: Fujitsu Limited, Kawasaki (JP)

( * ) Notice: Subject to any disclaimer, the term of this patent is extended or adjusted under 35 U.S.C. 154(b) by 963 days.

(21) Appl. No.: 10/043,933

(22) Filed: Jan. 11, 2002

(65) Prior Publication Data
US 2003/0056129 A1 Mar. 20, 2003

Related U.S. Application Data

(60) Provisional application No. 60/323,199, filed on Sep. 17, 2001.

(51) Int. Cl.
*G11C 7/00* (2006.01)
(52) U.S. Cl. .................. 365/226; 365/154; 326/93; 326/211
(58) Field of Classification Search ................ 365/154, 365/226; 326/93, 211
See application file for complete search history.

(56) References Cited

U.S. PATENT DOCUMENTS

| | | | |
|---|---|---|---|
| 5,764,089 A | 6/1998 | Partovi et al. | |
| 5,774,005 A | 6/1998 | Partovi et al. | |
| 5,898,330 A | 4/1999 | Klass | |
| 5,917,355 A * | 6/1999 | Klass | 327/208 |
| 5,990,717 A | 11/1999 | Partovi et al. | |
| 6,060,909 A * | 5/2000 | Aipperspach et al. | 326/98 |
| 6,087,872 A | 7/2000 | Partovi et al. | |
| 6,201,415 B1 * | 3/2001 | Manglore | 326/98 |
| 6,646,487 B1 * | 11/2003 | Nedovic et al. | 327/211 |
| 6,693,459 B1 * | 2/2004 | Nedovic et al. | 326/93 |

OTHER PUBLICATIONS

H. Partovi et al., "Flow-Through Latch and Edge-Triggered Flip-Flop Hybrid Elements", 1996 IEEE International Solid-State Circuits Conference. Digest of Technical Papers, ISSCC, San Francisco, CA, USA, Feb. 8-10, 1996.

(Continued)

*Primary Examiner*—Vu A. Le
(74) *Attorney, Agent, or Firm*—Sheppard Mullin Richter & Hampton LLP (57) ABSTRACT

Techniques, including a system and method, are disclosed for conditionally pre-charging a memory circuit, for example a flip-flop, and thus reducing power consumption. In an embodiment a method for reducing power consumption in a memory circuit, including, a pre-charged stage coupled to an evaluation stage by at least an internal node, is provided. The method includes setting an input of the pre-charged stage to a first high logic level. Next, responsive to the setting of the input, the internal node is set to a low logic level within a first transparency window. Then responsive to the setting of the internal node, the evaluation stage changes the output of the evaluation stage to a second high logic level within the first transparency window. Lastly, when the input remains at the first high-logic level, the internal node is maintained at the low logic level through at least a second transparency window.

29 Claims, 11 Drawing Sheets

OTHER PUBLICATIONS

B.S. Kong, S.-S Kim, Y.-H. Jun, "Conditional-Capture Flip-Flop Terchnique for Statistical Power Reduction" 2000 IEEE International Solid-State Circuits Conference, Digest of Technical Papers, pp. 290-291, Feb. 2000.

F. Klass, "Semi-Dynamic and Dynamic Flip-Flops with Embedded Logic", Symp. on VLSI Circ. Digest of Technical Papers, Jun. 1998.

J. Yuan, C. Svensson, "High-Speed CMOS Circuit Technique", IEEE Journal of Solid-State Circuits, vol. 24, (No. 1), pp. 62-70, Feb. 1, 1989.

N. Nedovic, V. G. Oklobdzija, "Hybrid Latch Flip-Flop with Improved Power Efficiency", Proceedings of Symposium on Integrated Circuits and Systems Design, pp. 211-215, 2000.

* cited by examiner

|   | Delay | Act. 0% (0) | Act. 0% (1) | Power/EDP Act. 33% | Act. 50% | Act. 100% |
|---|---|---|---|---|---|---|
| CPFF | 1.08 | 1.13/1.22 | 0.39/0.42 | 0.73/0.78 | 0.8/0.86 | 0.93/1.01 |
| ACPFF | 1.08 | 1.14/1.23 | 0.39/0.43 | 0.74/0.80 | 0.81/0.87 | 0.95/1.02 |
| CCFF | 1.43 | 1.21/1.74 | 0.32/0.46 | 0.73/1.04 | 0.82/1.17 | 0.95/1.55 |
| HLFF | 1 | 1/1 | 1/1 | 1/1 | 1/1 | 1/1 |

CONDITIONAL PRE-CHARGE METHOD AND SYSTEM

CROSS REFERENCES

This application claims priority from and incorporates by reference in its entirety U.S. Provisional Application Ser. No. 60/323,199 titled "Conditional Pre-charge Method and System" by Nikola Nedovic, et. al., filed Sep. 17, 2001.

FIELD OF THE INVENTION

The invention relates generally to the field of electronic circuit design, and in particular to an improved pre-charge technique for a digital logic circuit, for example, a digital logic flip-flop circuit.

BACKGROUND OF THE INVENTION

Over the last few years digital logic circuits have been increasing in speed and decreasing in size. As more digital circuitry is packed into a device, power consumption becomes an increasingly important issue. For example, cell phones, Personal Digital Assistants (PDAs), cameras, and so forth, rely on batteries, and minimizing power consumption is a major design goal. As these digital logic circuits include many flip-flops, reducing power usage by these flip-flops, reduces overall power consumption.

Figure 1:
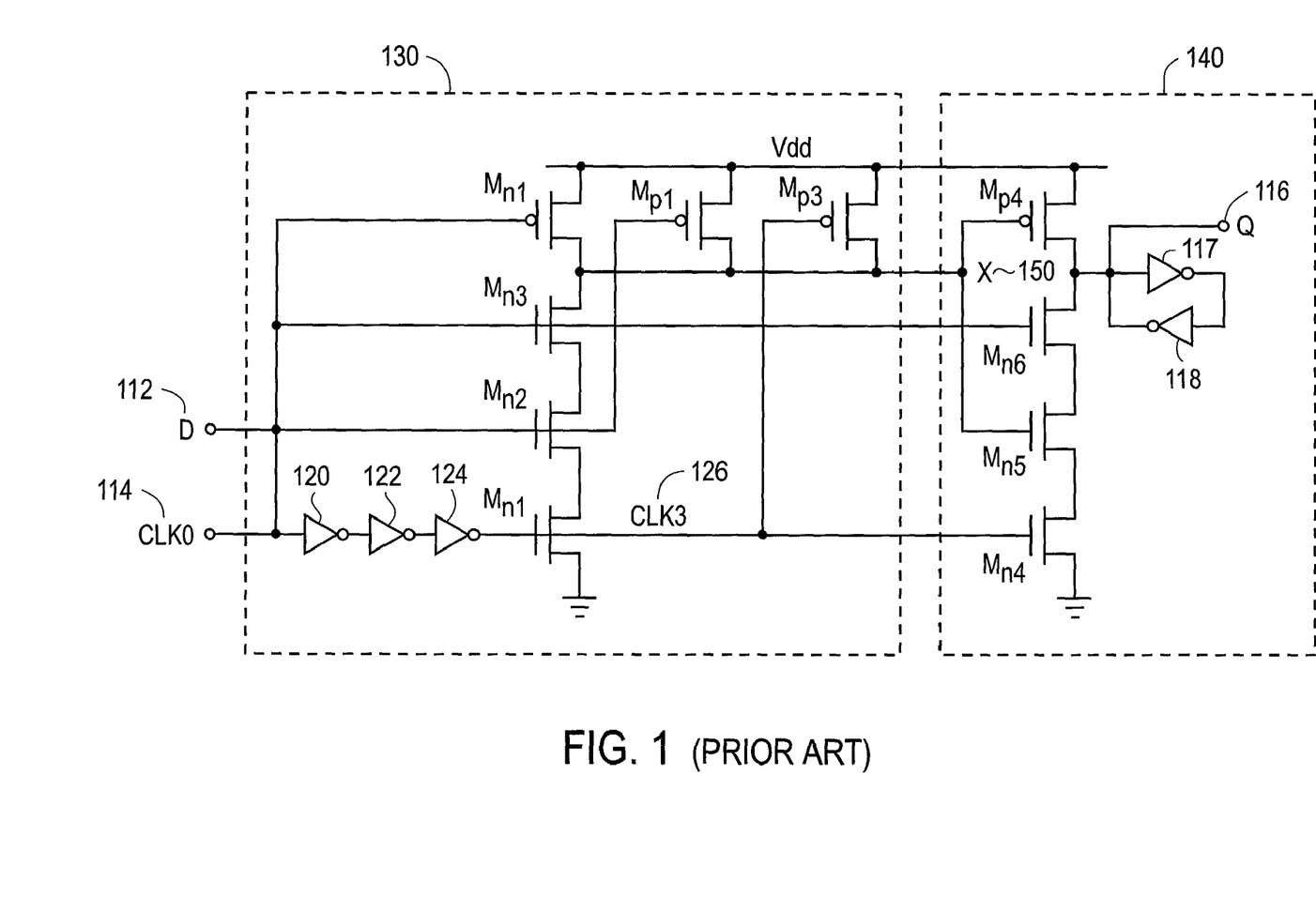
FIG. 1 is a schematic circuit diagram of a typical prior art fast D type flip-flop 110, a Hybrid Latch Flip-Flop (HLFF)

FIG. 1 is a schematic circuit diagram of a typical prior art fast D type flip-flop 110, a Hybrid Latch Flip-Flop (HLFF). The data input is D 112, the clock signal CLK0 114, and the output Q 116. The two inverters 117 and 118 are a "keeper" circuit which maintains the value of Q 116. CLK3 126 is the clock signal CLK0 114 inverted and delayed by the three inverters 120, 122, and 124. A transparency window for the HLFF is given by the propagation delay of the three inverters, 120, 122, and 124, connecting CLK0 114 to CLK3 126. The first stage 130 of the HLFF generates a high-to-low transition on node X 150 in the transparency window when the input D 112 signal is high. The first stage 130 is formed by a static CMOS 3-input NAND gate. The second stage 140 captures the transition on node X 150 generated by the first stage 130 and produces output Q 116. When the input D 112 is at the low logic level, the high-to-low transition on node X 150 does not appear.

Figure 2:
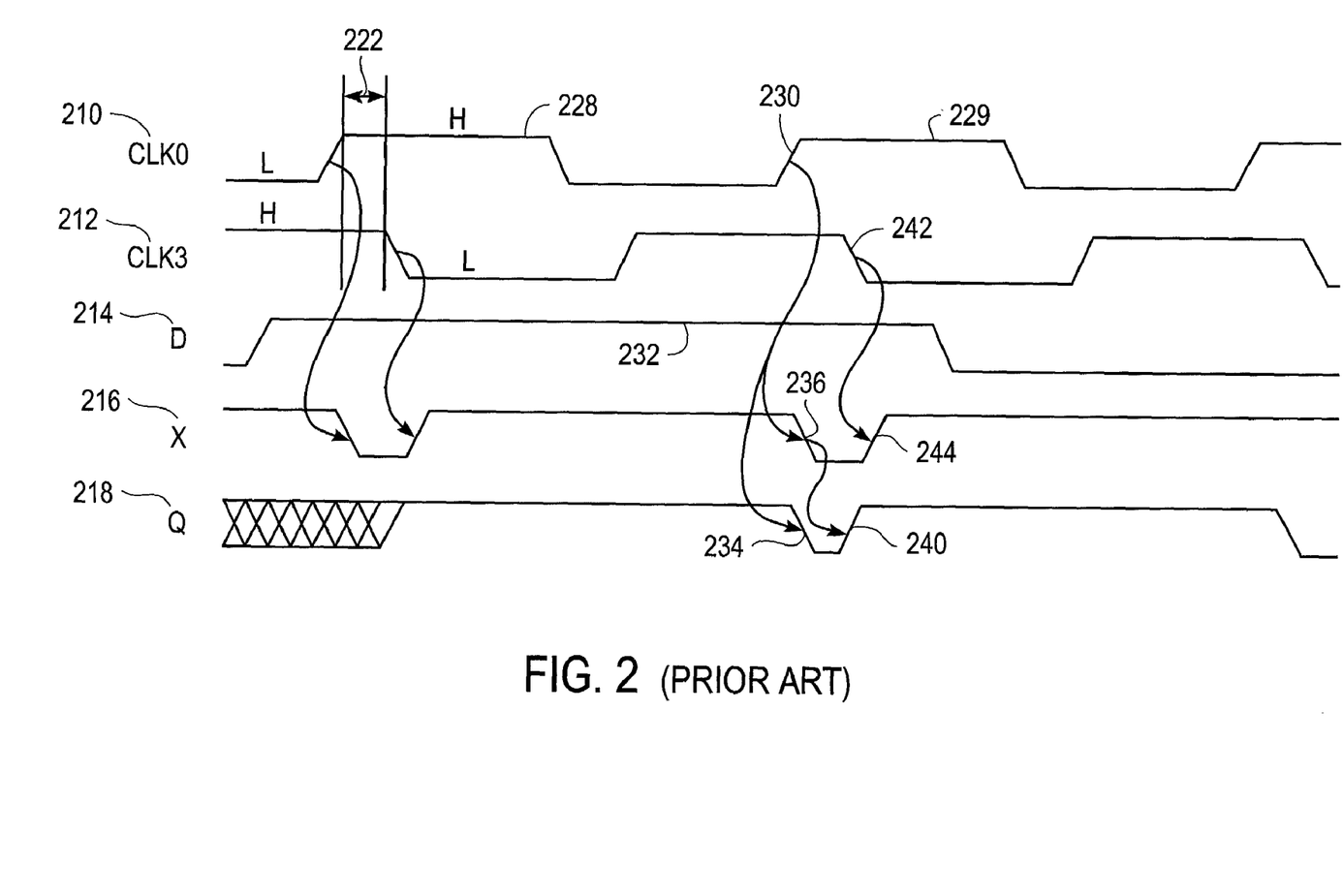
FIG. 2 is a timing diagram for the prior art HLFF schematic circuit diagram of FIG. 1 showing a glitch in the output and unnecessary power consumption.

FIG. 2 is a timing diagram for the prior art HLFF schematic circuit diagram of FIG. 1 showing a glitch in the output and unnecessary power consumption. The timing diagram shows the clock signals CLK0 210 and CLK3 212 representing the CLK0 114 and CLK3 126 in FIG. 1, respectively. A transparency window is shown by the time interval 222, which represents the three inverter delay. D 214, X 216, and Q 218 show the signals for D 112, node X 150, and Q 116 in FIG. 1 respectively. For example, an undesirable glitch occurs in a clock cycle 229, when Q 218 was set to high with D 214 equal to high at a previous clock cycle 228. At CLK0 transition 230 (a low logic level (L) to a high logic level (H)), D 214 is still H 232. During the nonzero time required for the evaluation of the first stage 130 (to set node X 150 to L), the second stage output Q 218 is pulled low, i.e., transition 234, since X 216 is H and the transparency window is open. After the first stage 130 changes X 216 to L, i.e., transition 236, the second stage 140 pulls Q 218 back up to H, i.e., transition 240. Hence a glitch in Q 218 occurs, when Q 218 should not change at all since D 214 is still one. The glitch is not only a potential hazard condition, but also consumes power unnecessarily.

The H to L transition 236 and L to H transition 244 of X 216 in FIG. 2 illustrates an additional power consumption problem, because the HLFF circuit consumes internal power even when the input is quiet (D=Q=H). As illustrated, there is an unconditional capture of the data level in the transparency window when the data is at a constant high level, i.e., when both input D and output Q are at H. In other words, X 216, in this constant high level case, always transitions from H to L following a positive clock edge, e.g., clock edge 230. However, this does not have any functionality since it can only set the output Q 116 to H, and the level the output Q 116 is already at H. Thus, the HLFF has a both hazard condition and a power consumption problem.

Figure 3:
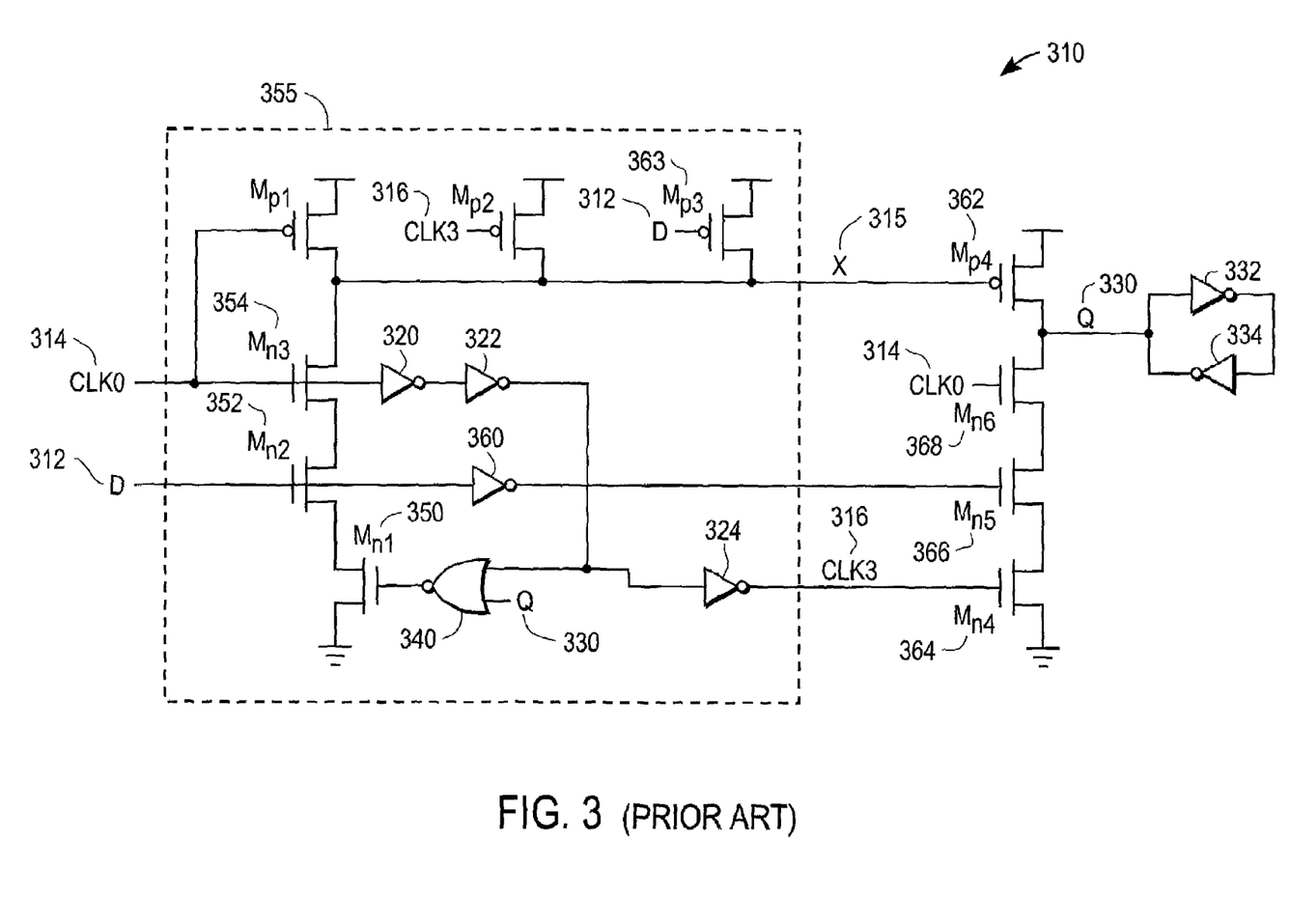
FIG. 3 is a schematic circuit diagram of a typical prior art Conditional Capture Flip-Flop (CCFF)

Another conventional flip-flop design is the Conditional Capture Flip-Flop (CCFF), which reduces the power consumption problem of the HLFF by inhibiting internal transitions if they are not going to be used to change the state of the flip-flop. FIG. 3 shows a single-ended version of the CCFF. In FIG. 3 a D type flip-flop is shown with input D 312, output Q 330, and Clock CLK0 314. The inverters 332 and 334 are for the keeper circuit for the output Q 330. CLK3 316 is the clock inverted and delayed by the three inverters 320, 322, and 324. When the input clock CLK0 314 is at L, the node X 315 is pre-charged (H). When the clock makes a L to H transition, the input D 312 is H, and the output Q 330 is L, the node X 315 determination is controlled by the pull-down nMOS path (Mn1 350, Mn2 352, and Mn3 354) of the first stage 355, which is open only in the transparency window (delay of two inverters, 320 and 322 and a NOR gate 340). The low level of node X 315 changes the output Q 330 from L to H. If there was a change of D 312 in or before the transparency window, the change of input D 312 from L to H is governed by the delay of the first stage 355 to set node X 315, because once node X 315 is L, Mp4 362 will pull Q 330 to H. The NOR gate 340 and Mp3 363 disables the evaluation of the first stage 355, if the low level of X is not going to be used to change the output level, i.e., when D 312 and Q 330 are already H. If the node X 315 remains high due to a L level on input D 312, the output Q 330 is set from H to L by the transistors Mn4 364, Mn5 366 and Mn6 368. If there was a change of D 312 in the transparency window, the change of input D 312 from H to L is governed by the delay of the inverter 360 to set Mn5 366.

While the CCFF typically has lower power consumption than the HLFF, there are several problems. First, it has a significantly higher delay time than the HLFF. This is due in part to the difference in the implementations of the conditional transparency window for L to H and H to L input D 312 transitions (assuming changes in the output Q 330). In effect, this reduces set-up time for the H to L transition at the input, since the transition has to propagate through the inverter 360 in order to be captured in the transparency window. In contrast, the L to H transition has a longer set-up time (by one inverter delay), because it may occur substantially in the transparency window, since it is captured from node X 315 out of the first stage 355. The result is a mismatch in set-up times for the two transitions (L to H and H to L) and consequently poor timing characteristics.

Another problem of the increased set-up time for the H to L transition, occurs when a heavy load is at the output Q 330 of the CCFF. Since the H to L transition of Q is allowed only in the transparency window, the arrival of the D input transition (H to L) may need to occur before the beginning of the transparency window in order to ensure proper discharge of Q 330 before the transparency window closes.

There is also a problem of power consumption in the output keepers of the HLFF and CCFF above (inverters 117 and 118 of FIG. 1 and inverters 332 and 334 of FIG. 3). The keeper is-used to hold the value of a dynamic node, e.g., Q, that would otherwise be in high impedance and thus sensitive to leakage current effects and noise, especially in low-power applications where clock gating techniques are typically employed. The problem is that in order to change the value of the output Q, the keeper has to be overpowered, which increases power consumption.

Therefore with the problems of hazard and power consumption with the HLFF and increased delay and set-up time problems with the CCFF, there is a need for an improved flip-flop with less problems, including improved power consumption. In addition there is a need for an improved flip-flop with the low delay advantage of the HLFF without the associated glitch and power consumption problems.

SUMMARY OF THE INVENTION

The present invention provides techniques, including a system and method, for conditionally pre-charging a memory circuit, for example, a flip-flop or a latch, and thus reducing power consumption. One embodiment significantly reduces power consumption, while preventing the glitch, i.e., a voltage or current spike of short duration, usually unintentionally produced and unwanted, of the HLFF. In this embodiment, the delay is not increased like the CCFF, in order to reduce power consumption. Another embodiment of the present invention includes a technique for not pre-charging the first stage based on certain conditions and for maintaining the output voltage of the flip-flop (or latch) without the use of a conventional keeper. An alternate embodiment provides for improved immunity to input glitches.

In one embodiment of the present invention a conditional pre-charge flip-flop circuit is provided that reduces power consumption. This circuit reduces internal power dissipation by disabling the pre-charge of the first stage of the flip-flop, i.e., keeping the output of the first stage low, if it is determined that the pre-charge is not needed in the next clock cycle. Thus compared to the typical HLFF circuit, power dissipation is reduced due to the prevention of unnecessary transitions. Since statistically, the input activity is low for many applications, i.e. in many of these cases the next data to be captured in the flip-flop is the same as the flip-flop state captured in the previous cycle, the advantage is a significant reduction in power consumption. Since the set-up times for H to L and L to H transitions are similar, this embodiment does not have the set-up problems of the typical CCFF. Another major advantage over the conventional flip-flops (or latches) using keepers, is that the need to fight the keeper on output transitions is absent, and hence power consumption is significantly reduced.

In one aspect of the present invention a method for reducing power consumption in a memory circuit, including, a pre-charged stage coupled to an evaluation stage by at least an internal node, is provided. The method includes setting an input of the pre-charged stage to a first high logic level. Next, responsive to the setting of the input, the internal node is set to a first low logic level within a first transparency window. Then responsive to the setting of the internal node, the evaluation stage changes the output of the evaluation stage to a second high logic level within the first transparency window. Lastly, when the input remains at the first high-logic level, the internal node is maintained at the first low logic level through at least a second transparency window. In one embodiment the memory circuit is a flip-flop, for example a D type flip-flop.

In yet another aspect of the present invention a conditional pre-charged system for reducing power consumption in a memory circuit is provided. The system includes: a data input including low and high logic levels; a data output including low and high logic levels; a pre-charge stage for receiving the data input and determining a pre-charge stage output depending upon the data input and the data output during a transparency window; and an evaluation stage for evaluating the pre-charge stage output to produce the data output during the transparency window. When the data input and the data output have high logic levels, the pre-charge stage output has a low logic level; and when the data input and the data output have the high logic levels through a subsequent transparency window, the pre-charge stage output remains at the low logic level through the subsequent transparency window.

Another embodiment of the present invention provides a conditional pre-charged system for reducing power consumption in a memory circuit. The system includes: a data input including low and high logic levels; a data output including low and high logic levels; a pre-charge stage for receiving the data input and determining a pre-charge stage output depending upon the data input during a transparency window, where the pre-charge stage output is feedback into the pre-charge stage; and an evaluation stage for evaluating the pre-charge stage output to produce the data output during the transparency window. When the data input and the data output have high logic levels, the pre-charge stage output has a first low logic level; when the data input and the data output have the high logic levels through a subsequent transparency window, the pre-charge stage output remains at the first low logic level through the subsequent transparency window; and when the data input transitions to a second low logic level before the subsequent transparency window, the pre-charge stage output is set to a high logic level at least until the subsequent transparency window.

These and other embodiments, features, aspects and advantages of the invention will become better understood with regard to the following description, appended claims and accompanying drawings.

DETAILED DESCRIPTION OF THE INVENTION

In the following description, numerous specific details are set forth to provide a more thorough description of the specific embodiments of the invention. It is apparent, however, to one skilled in the art, that the invention may be practiced without all the specific details given below. In other instances, well known features have not been described in detail so as not to obscure the invention.

Figure 4:
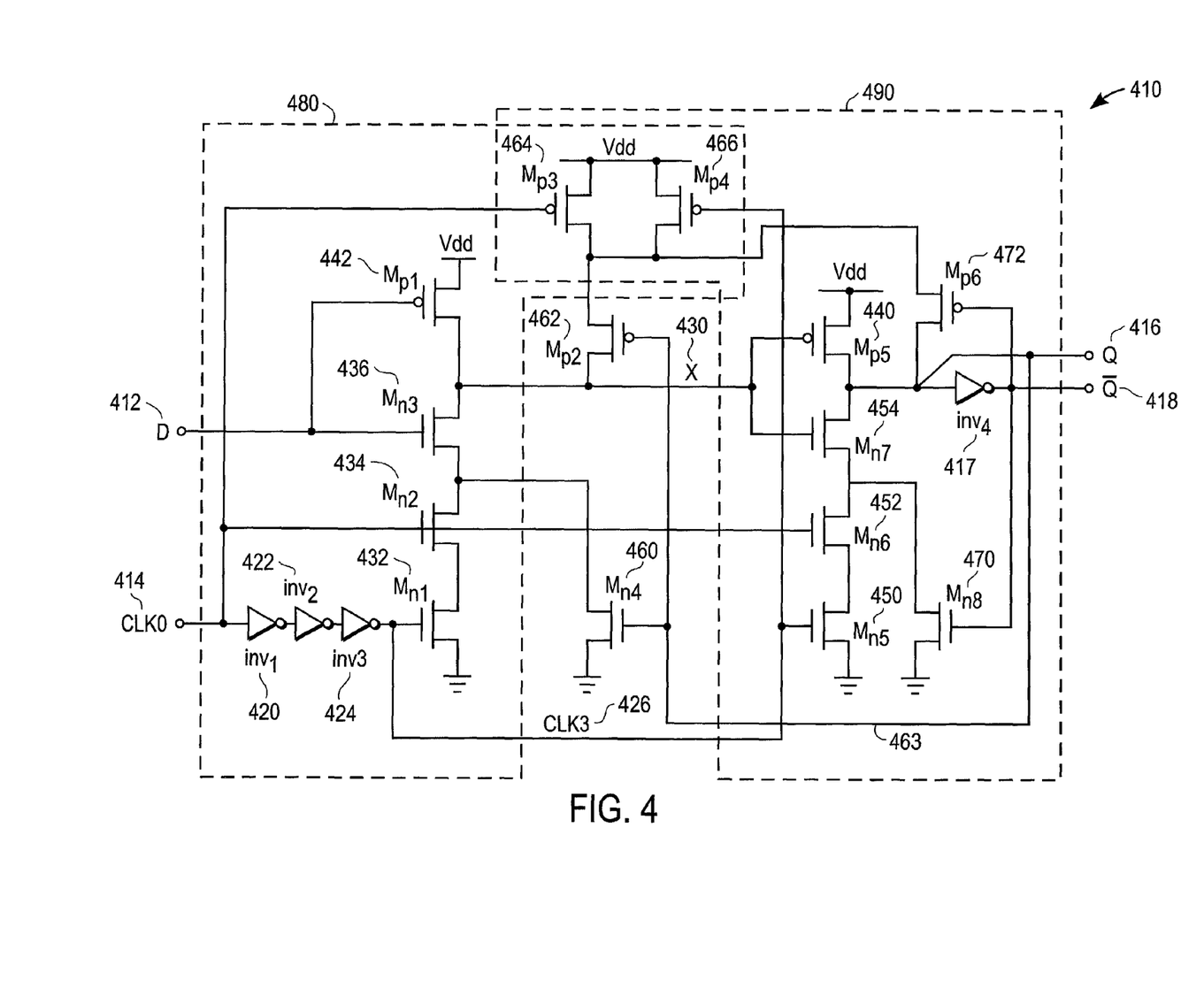
FIG. 4 is a schematic circuit diagram of a Conditional Pre-charge Flip-Flop (CPFF) of an embodiment of the present invention.

FIG. 4 is a schematic circuit diagram of one embodiment of the present invention. This and the other specific embodiments provided represent a Conditional Pre-charge Flip-Flop (CPFF). In FIG. 4 a D type flip-flop 410 is shown with input D 412, output Q 416, output Qbar 418 and Clock CLK0 414. CLK3 426 is the clock CLK0 414 inverted and delayed by the three inverters inv1 420, inv2 422, and inv3 424. An internal node and output of the first stage 480 is node X 430. The keeper circuit such as that represented by inverters 117 and 118 in FIG. 1 has been changed. As discussed below, this design removes the need to fight the conventional flip-flop "keeper," when there is a transition in output Q 416 (and Qbar 418). Thus power consumption is significantly reduced.

The embodiment of the CPFF shown in FIG. 4, comprises two logic stages, the pre-charge stage 480 and the evaluation stage 490. The first or pre-charge stage 480 is controlled by two reference signals: input clock CLK0 414 and reverse-polarity delayed clock CLK3 426. The high level (H) of both of these two signals occurs only for the short time after the rising edge of the input clock CLK0 414. The period of time during which both CLK0 and CLK3 are high is the transparency window of the flip-flop. Only during the transparency window is the high level on data input D 412 propagated to the internal node X 430 by pulling it to a low level (L) via transistors Mn1 432, Mn2 434, and Mn3 436. Consequently this transition is propagated to the output Q 416 via the transistor Mp5 440 in the evaluation or second stage 490, and pulls Q 416 high, i.e., Q 416 transitions from L to H. If the input D 412 is at the low level, the first stage output, i.e., node X 430, is set to the high level by transistor Mp1 442. The high level of node X 430 is propagated to the output Q 416 during the transparency window via transistors Mn5 450, Mn6 452, and Mn7 454 of the evaluation or second stage 490, and the flip-flop output Q 416 is pulled low, i.e. Q 416 transitions from H to L. When outside the transparency window, the internal node X 430 keeps its state, as provided by the transistors Mn4 460, Mp2 462, Mp3 464 and Mp4 466.

The first or pre-charge stage 480 of the flip-flop 410 is a fully static CMOS logic gate implementation of the logic function:

$$X = \overline{D} * (\overline{CLK0 * CLK3} + Q)$$

The second or evaluation stage 490 of the flip-flop 410 uses the high level of node X 430 in the transparency window, to set Q 416 to L using the nMOS stack (Mn5 450, Mn6 452, Mn7 454) and uses the low level of the node X 430 (in the transparency windows) to set Q 416 to H via transistor Mp5 440. When outside the transparency window, the output Q 416 keeps its state via the conditional "keeping" transistors Mn8 470, Mn7 454 and Mp3 464, Mp4 466 and, Mp6 472. The logic function implemented by the second or evaluation stage 490 is:

$$Q = X * (\overline{CLK0 * CLK3} + \overline{Q})$$

The transistors Mp3 464 and Mp4 466 are shared by the first stage 480 and the second stage 490. During the transparency window these transistors are turned off.

When D 412 and Q 416 are H from the previous clock cycle, then node X 430 is set to L by transistors Mn4 460 and Mn3 436. During the transparency window of the present clock cycle, if D is still H, then X remains L, i.e., it remains the same and does not pre-charge.

Figure 5:
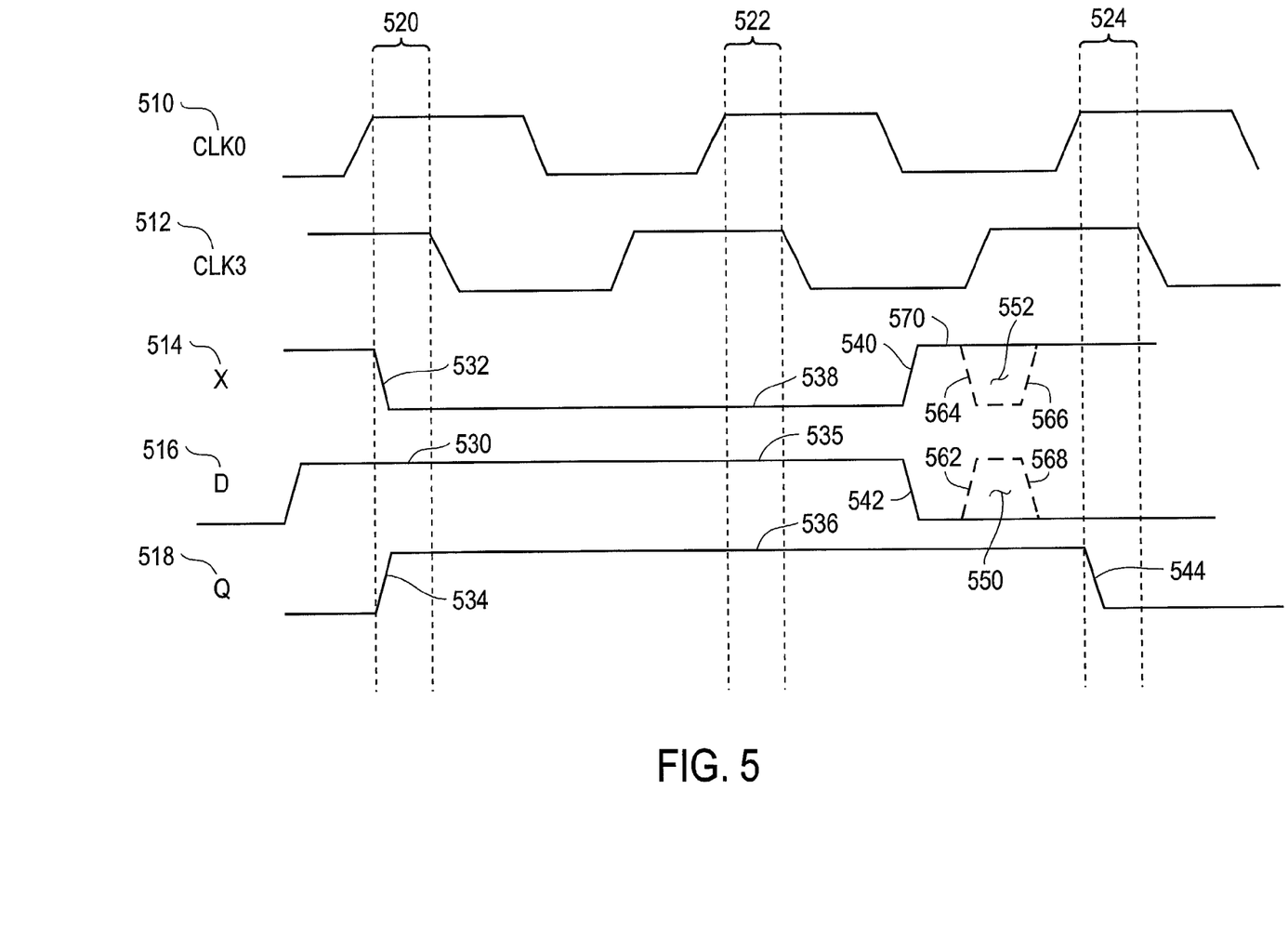
FIG. 5 is an example of a timing diagram illustrating the operation of the circuit of FIG. 4.

FIG. 5 is an example timing diagram showing, for illustration purposes, the operation of the circuit of FIG. 4. FIG. 5 shows the signals for CLK0 510, CLK3 512, X 514, D 516, and Q 518 representing the signals for clock CLK0 414, inverted and delayed clock CLK3 426, internal node X 430, input D 412, and output Q 416 of the D type flip-flop shown in FIG. 4, respectively. There are three transparency windows (CLK0 510 and CLK3 512 are at H) shown, 520, 522, and 524. In the first transparency window 520, if D 516 is H 530, then X 514 is discharged (H to L 532) in the first stage 480 and Q 518 goes from L to H 534 in the second stage 490. In the second transparency window 522 and between the first and second transparency windows, 520 and 522, if D 516 and Q 518 remain at H (535 and 536), then X 514 remains at L 538. Thus when input D 412 and output Q 416 remain at H in FIG. 4, the node X 430 does not pre-charge and power is conserved. When before the third transparency window 524, D 516 transitions from H to L 542 with Q 518 remaining H, then X 514 goes from L to H 540. At the third transparency window 524 Q then transitions from H to L 544. Note the L to H to L 550 and H to L to H 552 transitions will be explained later.

The saving of the power consumption in FIG. 4 may be explained as follows: once the pre-charge or first stage 480 is at the low logic level, it will remain at L until an input D 412 (e.g., D=L), that should reset the output Q 616 (transitions Q from H to L) at the next clock edge, is applied. The power savings is accomplished by controlling the return of the internal node X 430 to the inactive (high) state using the information about the previous flip-flop state (Q). Referring to FIG. 4, if both the flip-flop output Q 416 and input D 412 are H, transistors Mn3 436 and Mn4 460 keep the node X 430 at L. Therefore, no redundant pre-charge of the first stage 480 occurs. If either the flip-flop output Q 416 or input D 412 is L, the first stage 480 pre-charge is enabled (X=H), so that node X 430 is prepared for the next transition. This way, the power consumption of the flip-flop at low input activity (i.e. when two consecutive inputs captured by the flip-flop are frequently the same) is reduced. Therefore, in this embodiment, the pre-charged stage is pre-charged, i.e., transitioned from L to H only upon certain conditions of the input and/or output of the flip-flop. In other words, the first stage is conditionally pre-charged.

The conditional pre-charge technique also solves the problem of the glitch that arises at the output Q in conventional realizations, e.g., HLFF, due to the non-zero time to pull down the internal node X. In conventional flip-flops, if D=Q=H at the rising clock edge, the output will make a false transition from H to L, returning again to H after the L to H transition of the internal node X. The described problem does not exist in CPFF because if D=Q=H, the internal node X 430 is already set to L, which disables the path from the output Q to ground (Mn5 450, Mn6 452, Mn7 454) before the transparency window.

The keepers that are typically at the output Q of conventional flip-flops, e.g., inverters 117 and 118 in FIG. 1 and inverters 332 and 334 of FIG. 3, consume significant power when transitions occur in the output Q. Specifically, it is the feedback inverter, e.g., inverter 118 in FIG. 1 and inverter 334 in FIG. 3, which maintains or "keeps" the output Q that needs to be over-powered, when a transition from L to H or H to L happens on the output Q. For example, in FIG. 3 when Q 330 is H and D 312 is L in the current transparency window, then nMOS transistors Mn4 364, Mn5 366, and Mn6 368 are on and pull Q 330 to L. These nMos transistors fight against the pMOS transistor of inverter 332 which tries to keep Q 330 at H. Thus when using a keeper, there is an increase in power needed to transition Q 330 from H to L versus not having inverter 332. Since pMOS transistors are substantially larger than nMOS transistors, there is a lesser increase in power needed, when the transition of Q 330 is from L to H, as the pMOS transistor Mp4 362 fights, i.e., increases power consumption, against the nMOS transistor in the inverter 332 to pull Q 330 to H.

This embodiment of the present invention replaces the feedback keeper inverter, e.g., inverter 118 in FIG. 1 and inverter 334 in FIG. 3, with a tri-state inverter (H, L, or high impedance output), which is open during the transparency window and closed outside of the transparency window. The result is that the output Q can be changed without fighting the feedback keeper inverter, but be maintained by that feedback keeper inverter after the transition. The fight is the power expended in changing the output of the keeper, e.g., from a H to L or L to H. This circuit is called a "conditional keeper." In FIG. 4 the tri-state inverter is implemented in one embodiment by conditional "keeping" transistors Mn8 470, Mn7 454 and Mp3 464, Mp4 466, Mp6 472. Outside the transparency window Mp3 464 and Mp4 466 are on, and Mn8 470 and Mn7 454 maintain Q 416 at L and Mp6 472 maintains Q 416 at H. Inside the transparency window, Mp3 464 and Mp4 466 are off, and if Q 416 is H, then Mp6 472 is essentially disconnected, and Q 416 can be pulled low without fighting Mp6 472 (where Mp6 472 if connected directly to Vdd would try to keep Q 416 high). If Q 416 is L and if D is H during the transparency window, then X goes to L and transistor Mn7 454 is turned off; hence, transistor Mn8 is disconnected. Thus Q 416 can be set during the transparency window without fighting, what would be in the conventional case, the "keeper inverter," and be maintained outside the transparency window by this "keeper inverter." The advantage is a functionally equivalent "keeper circuit" with significantly reduced power consumption.

Figure 6:
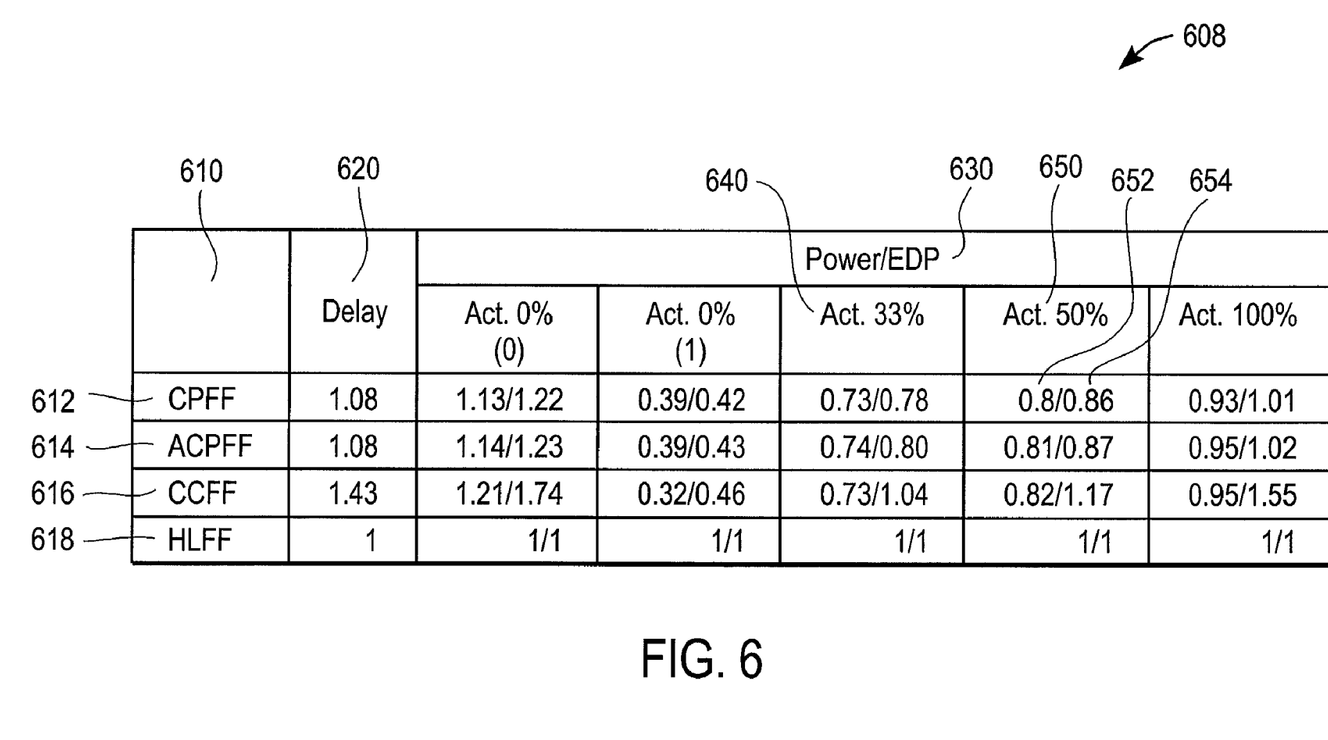
FIG. 6 is a table comparing the performance of two embodiments of the present invention with two conventional flip-flops.

The above embodiment has a substantially similar delay to the HLFF circuit, but with lower power consumption and the glitch is absent. FIG. 6 shows a table 608 comparing the performance of two embodiments of the present invention with two conventional flip-flops. The first column of table 608 lists the four flip-flops that are compared: the CPFF 612 (the above embodiment of FIG. 4), another embodiment of the CPFF, i.e., ACPFF, (the embodiment of FIG. 9, to be discussed later), the conventional CCFF 616, and the conventional HLFF 618. The results in table 608 are simulation results using a SPICE simulator and models and are normalized to the values of the HLFF 618. The delay column 620 shows a normalized delay of 1.08 for the CPFF 612 and ACPFF 614 and a normalized delay of 1.43 for the CCFF 616. Hence the delays for the embodiments of the CPFF and ACPFF are substantially similar to the delay of the HLFF.

The delay of the CCFF 616 is significantly greater than the HLFF. Examining the columns of low activity (Act. 33%) 640 and medium activity (Act. 50%) 650, shows that the CPFF 612, ACPFF 614, and CCFF 616 have significantly less power consumption than the HLFF. For example, the power consumption for the CPFF at Act. 50% 750 is 0.8 (652) and the EDP (Energy Delay Product) is 0.86 (654). Therefore the embodiments of the CPFF 612 and ACPFF 614 given in table 608 have substantially the same delay as the HLFF with a significantly reduced power consumption.

Figure 7:
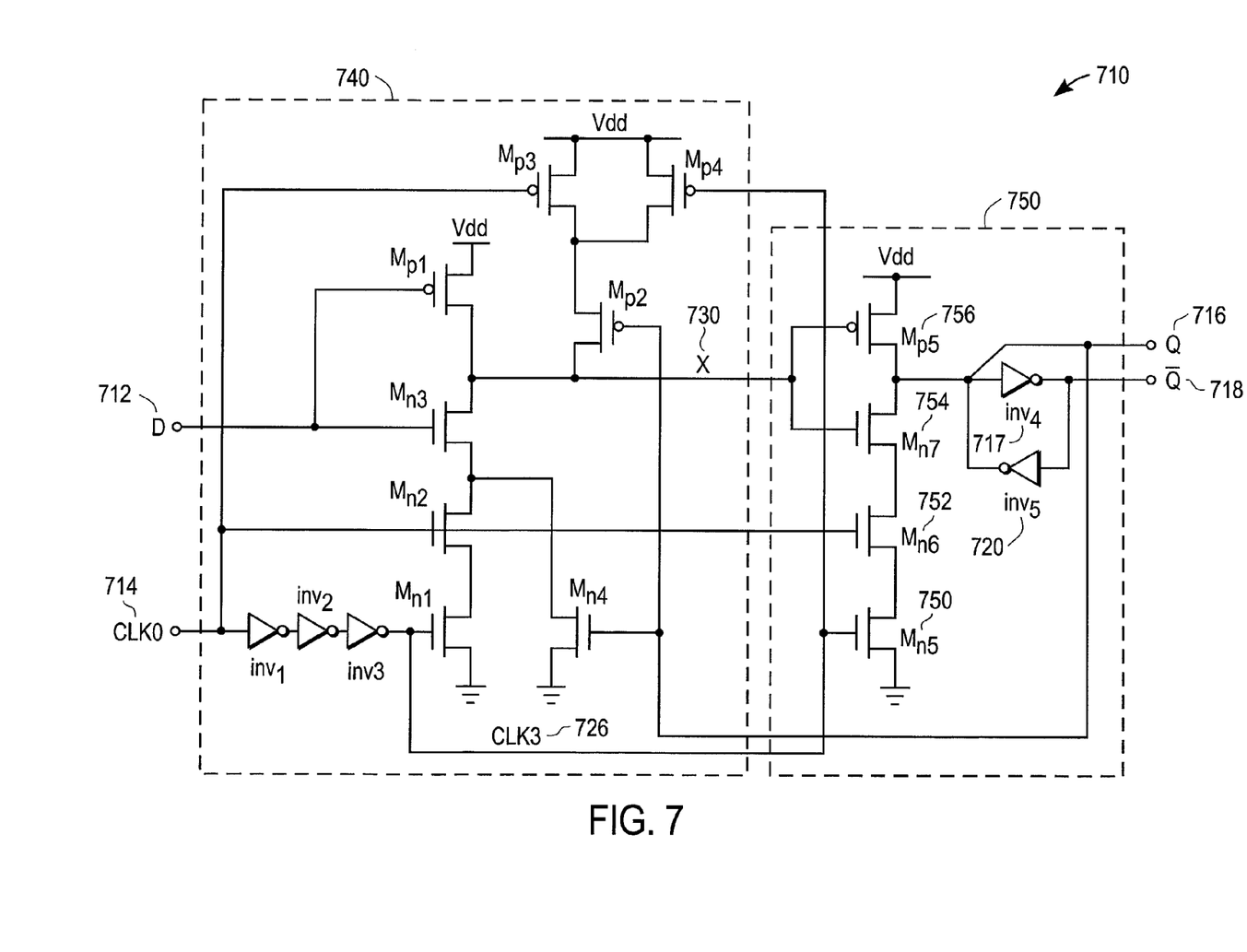
FIG. 7 is a schematic circuit diagram of a CPFF of an another embodiment of the present invention having a conventional keeper at the output.

FIG. 7 is a schematic circuit diagram of a CPFF of a second embodiment of the present invention having a conventional keeper at the output. The waveforms for FIG. 6 are similar to those of FIG. 4 and the circuit in FIG. 6 differs from FIG. 4 in that the conditional keeper transistors Mn8 470, and Mp6 472 in FIG. 4 have been replaced by inverter inv5 720 in FIG. 6. Thus this embodiment uses the conventional back-to-back inverters as the keeper. This means that the second stage forward path transistors (Mp5 756, Mn5 750, Mn6 752, and Mn7 754) need to overpower the inverter inv5 720, when the state of the output Q 716 is changed. This embodiment incorporates the conditional pre-charge technique of the present invention, without the improvement from the conditional keeper in the second stage.

Figure 8:
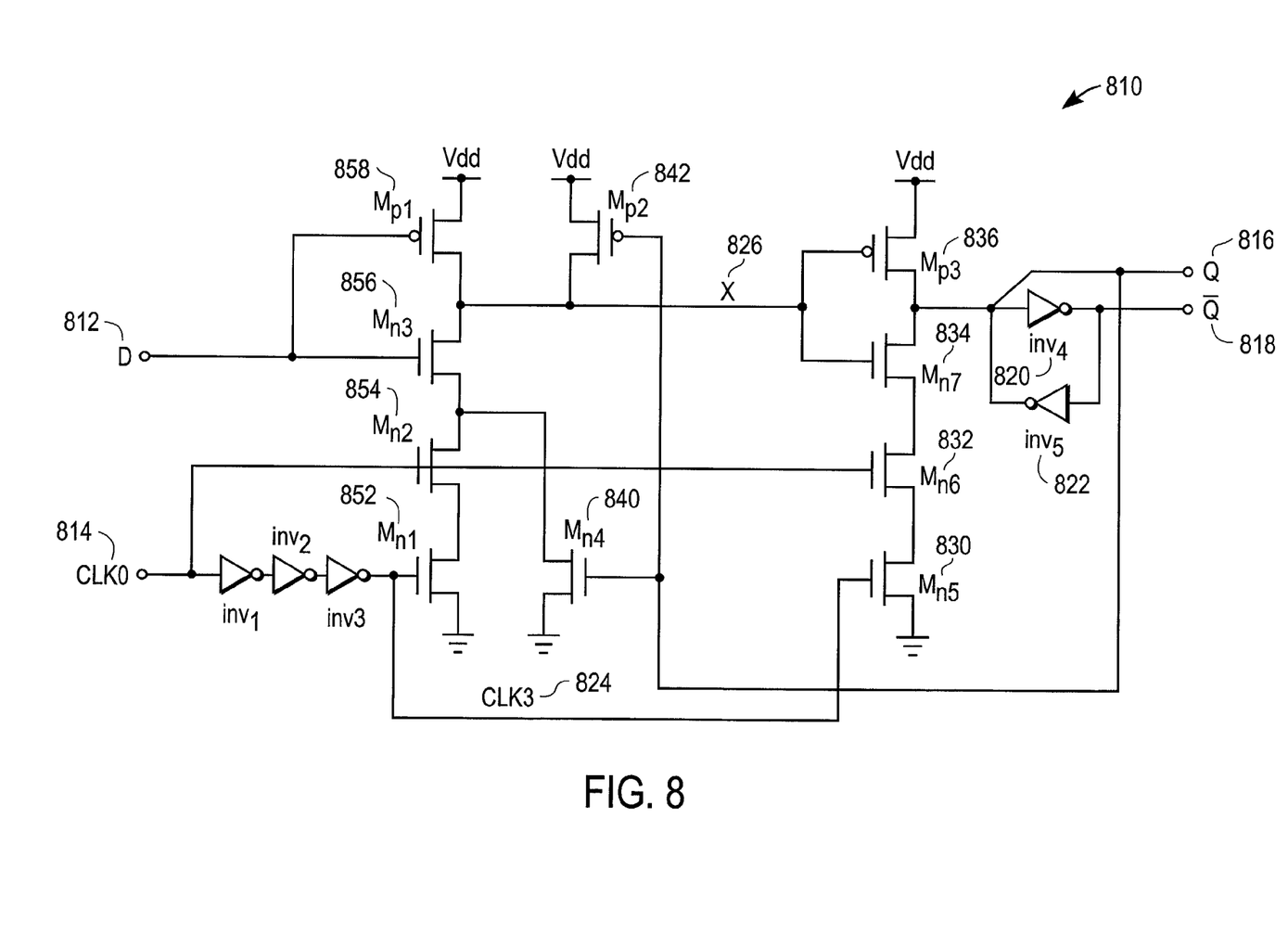
FIG. 8 is a schematic circuit diagram of a CPFF of an alternative embodiment of the present invention having unconditional keepers at the internal node and the output.

FIG. 8 is a schematic circuit diagram of a third embodiment of the present invention having unconditional keepers at the internal node and the output. This embodiment gives an unconditional keeper (Mn4 840 and Mp2 842) for node X 826 and an unconditional keeper (Inv4 820 and Inv5 822) for output Q 816. The keepers behave as weak default drivers of the node/output. In particular, if any other transistor path drives the node/output, such other transistor path should be designed to be stronger than the keeper and overpower it. If no other path drives the node/output, the keeper will maintain the voltage level at the node/output.

While using the prior art unconditional keepers reduces the complexity of the circuit (as can be seen in comparing FIG. 8 with FIG. 4), the prior art unconditional keeper needs increased power (e.g. crossbar current) to overpower the keepers. Both first stage and second stage forward path transistors (Mn1 852, Mn2 854, Mn3 856, and Mp3 836, Mn5 830, Mn6 832, Mn7 834) need to overpower the keepers when the output Q 816 changes. The circuit performance due to the unconditional keeper implementation in the first stage, especially Mp2 842, controlled by the output Q 816, is particularly sensitive to the flip-flop load, since the duration of the time the keeper Mp2 842 fights the forward path (Mn1 852, Mn2 854, and Mn3 856) depends on the arrival of a high level on output Q 816. Thus, this embodiment is preferably used with a lightly loaded output Q 816 in order to reduce the delay from node X 826 to output Q 816.

Some embodiments of the CPFF of the present invention may exhibit the problem of increased power consumption, when the output Q is at the high logic level (Q=H). In this case X=$\overline{D}$, i.e., the first stage is transparent. This can be observed from FIG. 4 and the logic function of the first stage 480 of the flip-flop 410. In this case, any transition of input D will propagate to the internal node X 430. FIG. 5 illustrates this with glitch 550 on input D 516. When D 516 transitions from L to H 562 and H to L 568, X 514 follows with H to L 564 and l to H 566, respectively. Hence a glitch 550 on D 516 gives a glitch 552 on X 514. Thus when glitches on input signal D 412 exist, e.g., glitches due to unbalanced logic delays before the flip-flop, the power savings due to the conditional pre-charge may be reduced by the power consumed on the propagation of input D 412 to the node X 430, i.e., spurious dissipation occurs.

Figure 9:
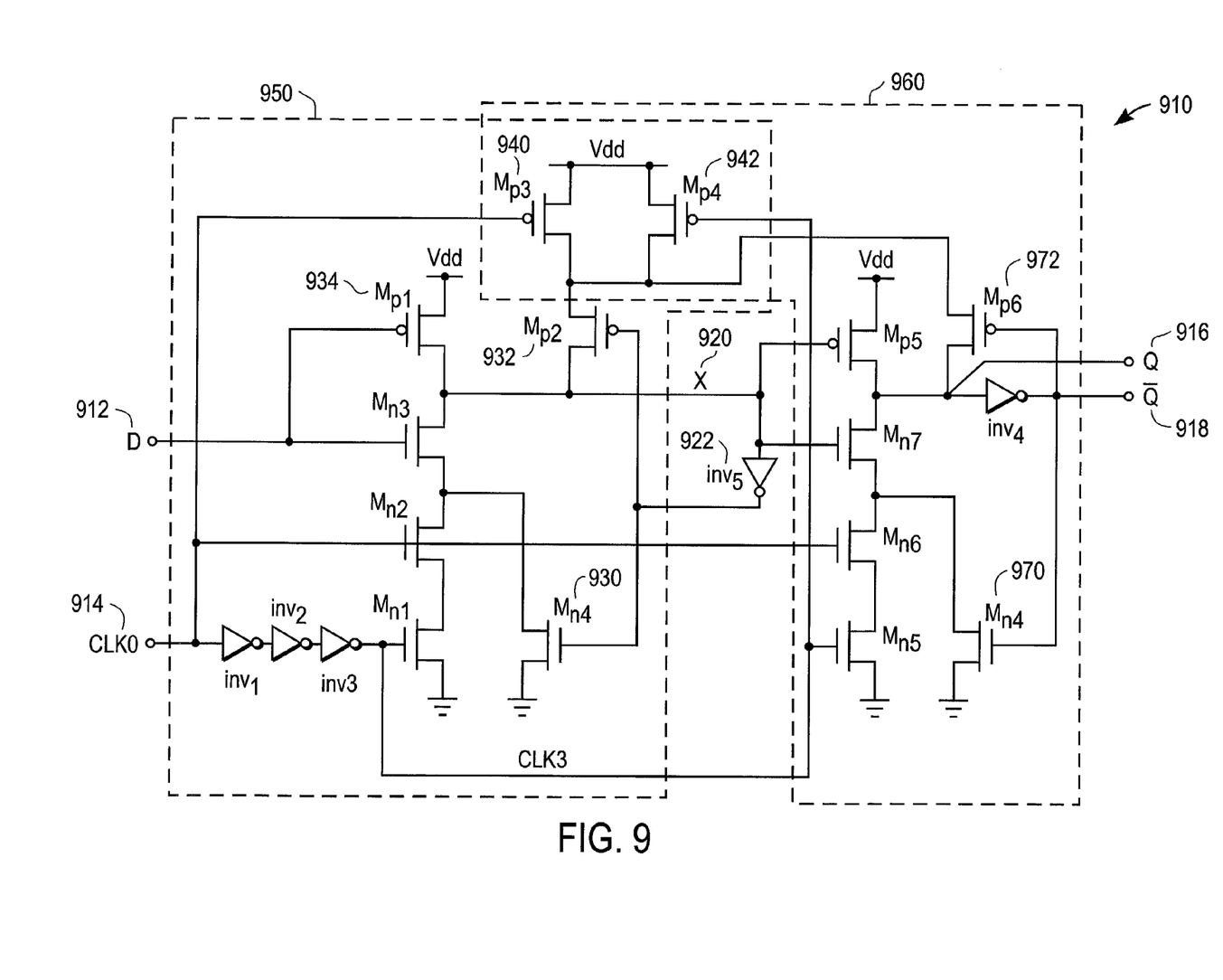
FIG. 9 is a schematic circuit diagram of another embodiment of a CPFF of the present invention.

FIG. 9 is a schematic circuit diagram of a CPFF of another embodiment of the present invention. The feedback line 463 (FIG. 4) from output Q 416 to Mn4 460 and Mp2 462 has been replaced by a path from node X 920 through inverter inv5 922 to Mn4 930 and Mp2 932. If the internal node X 920 is at a low level, it stays at L as long as input D 912 is H. If the input D 912 changes to L, transistor Mp1 934 sets the internal node X 920 to H. After that and before the transparency window, the locally implemented feedback (inverter Inv5 922 and transistors Mp2 932, Mp3 940, and Mp4 942) prevents any H to L transition of the internal node X 920 and hence reduces spurious power dissipation. Thus, from FIG. 5 the glitch 550 in D 516 does not cause a glitch 552 in X 514. X 514 is locked at H 570. The logic function of the first or pre-charge stage 950 is:

$$X=D*(CLK0*CLK3+\overline{X})$$

The logic function of the second or evaluation stage 960 is unchanged:

$$Q=X*(CLK0*CLK3+\overline{Q})$$

Thus the alternative conditional pre-charge technique reduces the internal power dissipation caused by the glitches at the flip-flop input D 912. The internal activity of the flip-flop is reduced by disabling high-to-low transitions of the internal node X 920 out of the transparency window. Therefore, the flip-flop first stage 950 is not transparent to the input glitches on D 912.

Figure 10:
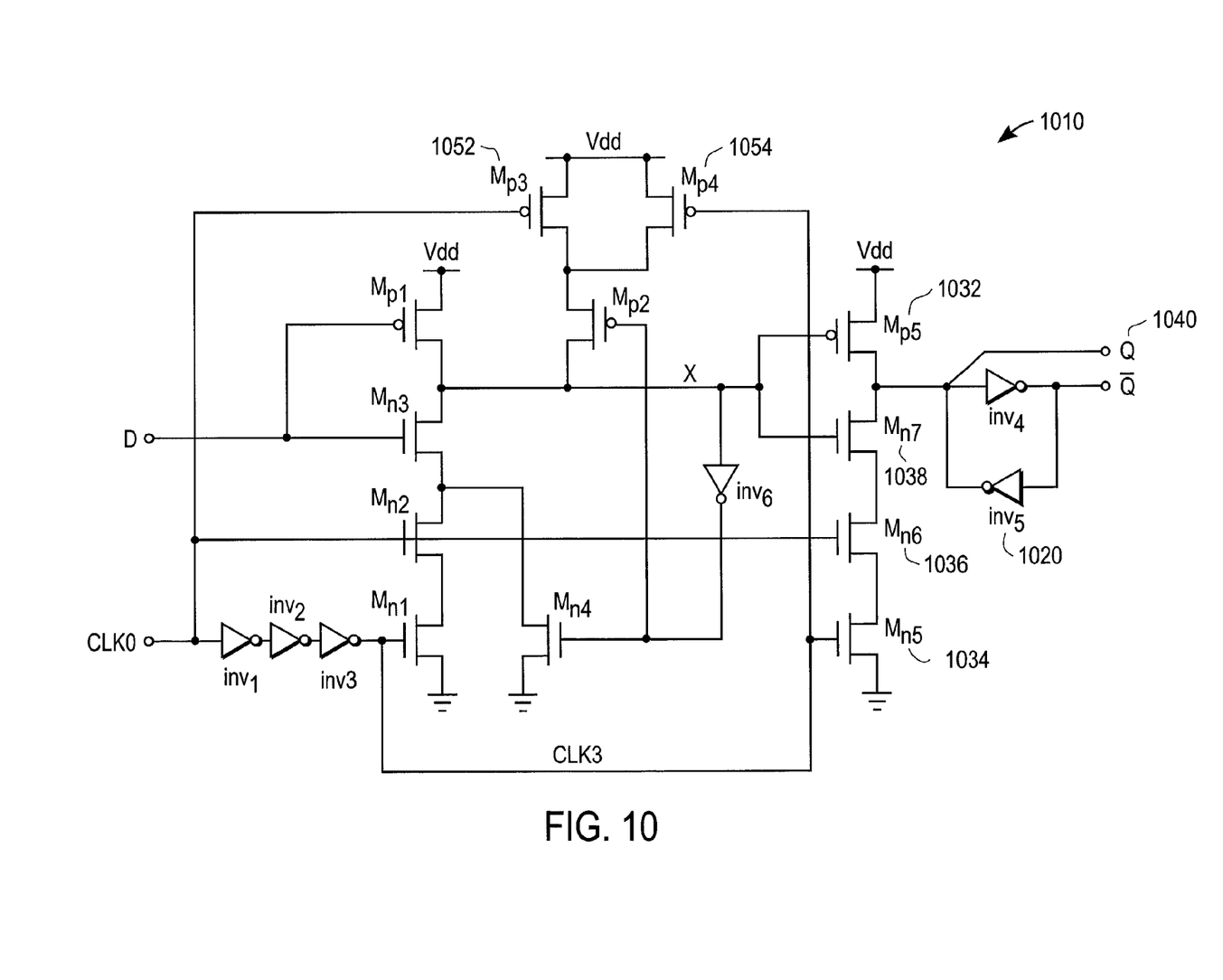
FIG. 10 is a schematic circuit diagram of yet another embodiment of a CPFF of the present invention having a conventional keeper at the output.

FIG. 10 is a schematic circuit diagram of a CPFF of yet another embodiment of the present invention having a conventional keeper at the output. The circuit in FIG. 10 is similar to the circuit in FIG. 9, except the transistors Mn8 970 and Mp6 972 are removed and inverter inv5 1020 has been added. The second stage forward path transistors (Mp5 1032 and Mn5 1034, Mn6 1036, Mn7 1038) need to overpower the keeper, in particular inv5 1020, when the state of the output Q 1040 is changed.

Figure 11:
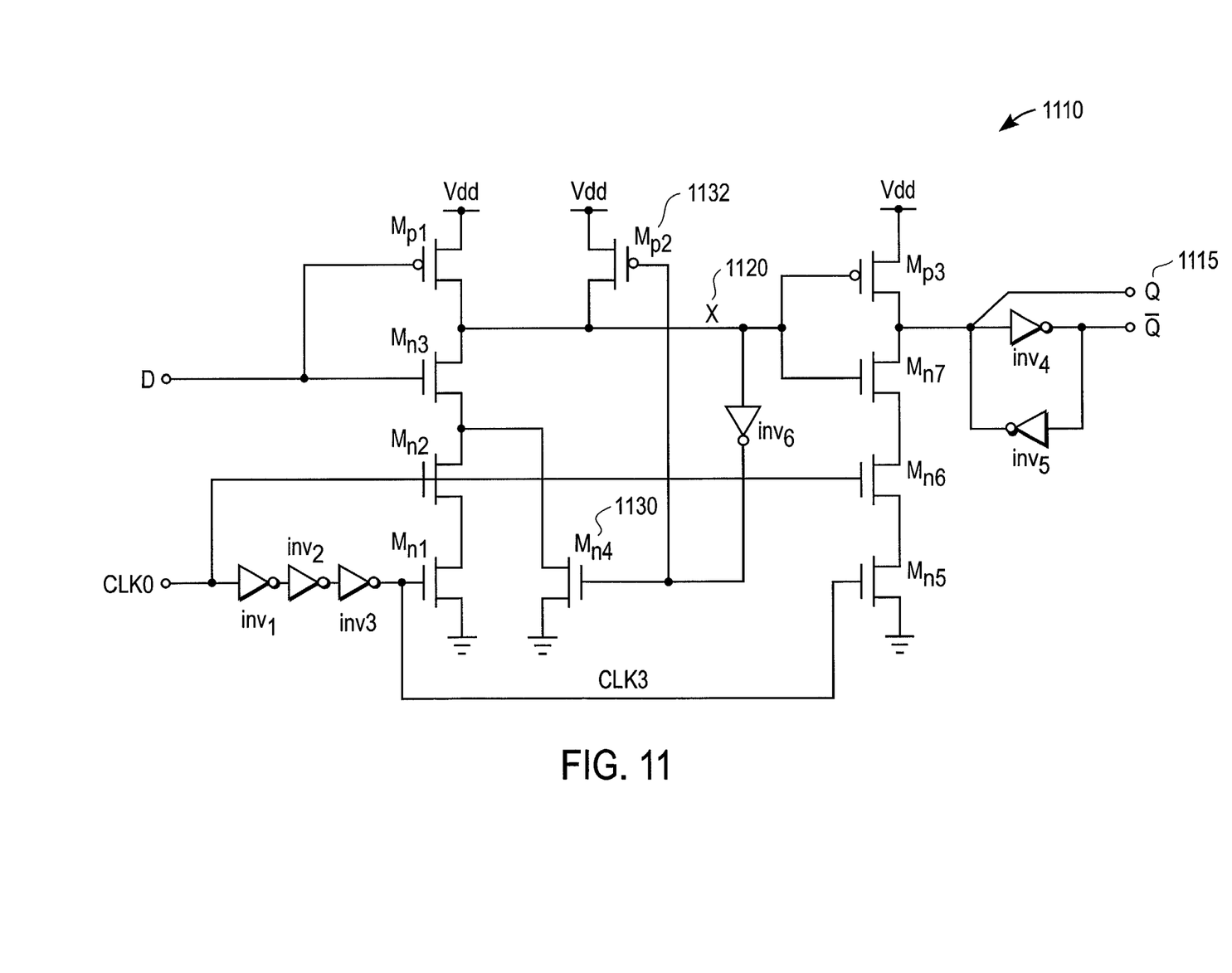
FIG. 11 is a schematic circuit diagram of yet another embodiment of a CPFF of the present invention having an unconditional keeper at the internal node and the output.

FIG. 11 is a schematic circuit diagram of yet another embodiment of a CPFF of the present invention having an unconditional keeper at the internal node and the output. FIG. 11 is similar to FIG. 10 except the transistors Mp3 1052 and Mp4 1054 have been removed. The disadvantage in FIG. 8 for the third embodiment of the CPFF on the extended duration of crossbar current due to a heavy output Q load, when overpowering the keeper in the first stage, i.e. supplying enough power to change the state of the keeper, does not hold here. This is because the signal that controls the node X 1120 keeper (Mn4 1130 and Mp2 1132) is the inverted node X 1120 signal, which is not a function of the output Q 1115 load.

Although specific embodiments of the invention have been described, various modifications, alterations, alternative constructions, and equivalents are also encompassed within the scope of the invention. While a transparency window of three inverters is given in some embodiments in this disclosure, the transparency window is not so limited. In an alternative there may be an odd number of inverters, where the odd number is greater than one. In an yet another embodiment there may be one or more inverters. The transparency window in other embodiments of the present invention include any time duration in which both the pre-charge or first stage and the evaluate or second stage are active. For example the transparency window in FIG. 4 is when both CLK0 414 and CLK3 426 are H, but other activation schemes as determined by one of ordinary skill in the arts may be used and are within the scope of this invention. In addition while the disclosed embodiments show a D type flip-flop, the scope of this invention includes other flip-flops, latches, and memory circuits in which there is a first or pre-charge stage and an evaluation or second stage coupled together by at least one internal node, were this internal node is charged or discharged.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for reducing power consumption in a memory circuit, comprising, a pre-charged stage coupled to an evaluation stage by at least an internal node, said method comprising:
    setting an input of said pre-charged stage to a first high logic level;
    responsive to said setting said input, setting said internal node to a first low logic level within a first transparency window;
    responsive to said setting said internal node, said evaluation stage changing said output of said evaluation stage to a second high logic level within said first transparency window; and
    when said input remains at said first high-logic level, maintaining said internal node at said first low logic level through at least a second transparency window.

2. The method of claim 1 wherein said transparency window comprises when said internal node is logically equivalent to an inverted input.

3. The method of claim 1 wherein said second transparency window is a transparency window subsequent to said first transparency window.

4. The method of claim 1 wherein said memory circuit is a flip-flop.

5. The method of claim 4 wherein said flip-flop is a D type flip-flop.

6. The method of claim 1 wherein said maintaining said internal node at said first low logic level includes maintaining said output at said second high logic level.

7. The method of claim 1 further comprising, after said first transparency window, if said input transitions from said first high logic level to a second low logic level, setting said internal node to a third high logic level until at least said second transparency window.

8. A conditional pre-charged system for reducing power consumption in a memory circuit comprising:
    a pre-charge stage for determining a pre-charge stage output depending upon a data input and a data output during a transparency window; and
    an evaluation stage for evaluating said pre-charge stage output to produce said data output during said transparency window;
    wherein when said data input and said data output have high logic levels, said pre-charge stage output has a low logic level; and
    wherein when said data input and said data output have said high logic levels through a subsequent transparency window, said pre-charge stage output remains at said low logic level through said subsequent transparency window.

9. The conditional pre-charged system of claim 8 further comprising a first clock for activating said pre-charged stage, and a second clock for activating said evaluation stage, wherein said second clock comprises said first clock inverted and delayed.

10. The conditional pre-charged system of claim 8 wherein said first transparency period comprises when said first clock and said second clock both have high logic levels.

11. The conditional pre-charged system of claim 8 wherein said evaluation stage comprises a conditional keeper.

12. The conditional pre-charged system of claim 11 wherein said conditional keeper comprises an inverter coupled to a tri-state inverter.

13. The conditional pre-charged system of claim 8 wherein said evaluation stage comprises an unconditional keeper.

14. The conditional pre-charged system of claim 13 wherein said unconditional keeper comprises back-to-back inverters.

15. The conditional pre-charged system of claim 8 wherein said data output is feedback into said pre-charge stage.

16. The conditional pre-charged system of claim 8 wherein said pre-charge stage comprises a conditional keeper.

17. The conditional pre-charged system of claim 8 wherein said pre-charge stage comprises an unconditional keeper.

18. The conditional pre-charged system of claim 17 wherein said unconditional keeper comprises an nMOS and a pMOS transistor.

19. The conditional pre-charged system of claim 8 wherein said memory circuit is a flip-flop.

20. A conditional pre-charged system for reducing power consumption in a memory circuit comprising:
    a pre-charge stage for determining a pre-charge stage output depending upon a data input during a transparency window, wherein said pre-charge stage output is feedback into said pre-charge stage;
    an evaluation stage for evaluating said pre-charge stage output to produce a data output during said transparency window;
    wherein when said data input and said data output have high logic levels, said pre-charge stage output has a first low logic level; and
    wherein when said data input transitions to a second low logic level before a subsequent transparency window, said pre-charge stage output is set to a high logic level at least until said subsequent transparency window.

21. The conditional pre-charged system of claim 20 wherein said evaluation stage comprises a conditional keeper.

22. The conditional pre-charged system of claim 20 wherein said conditional keeper comprises an inverter coupled to a tri-state inverter.

23. The conditional pre-charged system of claim 20 wherein said evaluation stage comprises a conventional keeper.

24. The conditional pre-charged system of claim 23 wherein said unconditional keeper comprises back-to-back inverters.

25. The conditional pre-charged system of claim 20 wherein said pre-charge stage comprises a conditional keeper.

26. The conditional pre-charged system of claim 20 wherein said pre-charge stage comprises an unconditional keeper.

27. The conditional pre-charged system of claim 26 wherein said unconditional keeper comprises an nMOS and a pMOS transistor.

28. The conditional pre-charged system of claim 20 wherein said memory circuit is a flip-flop.

29. A conditional pre-charged system for reducing power consumption in a flip-flop comprising:
    a first means for determining a pre-charge output depending upon a data input and a data output during a transparency window;
    a second means for evaluating said pre-charge output to produce said data output during said transparency window; and
    a keeper means for maintaining said data output between transparency windows;
    wherein when said data input and said data output have high logic levels, said pre-charge output has a low logic level; and
    wherein when said data input and said data output have said high logic levels through a subsequent transparency window, said pre-charge output remains at said low logic level through said subsequent transparency window.

* * * * *